United States Patent [19]

Crowther

[11] Patent Number: 5,778,945

[45] Date of Patent: Jul. 14, 1998

[54] AUTOMATIC WIRE TWISTER

[75] Inventor: Richard J. Crowther, Dundas, Canada

[73] Assignee: Tempel Steel Company, Inc., Skokie, Ill.

[21] Appl. No.: 818,001

[22] Filed: Mar. 14, 1997

[51] Int. Cl.$^6$ ..................................................... B21F 15/04
[52] U.S. Cl. ........................................... 140/115; 100/31
[58] Field of Search .............................. 29/738; 100/12, 100/31, 33 R; 140/115

[56] References Cited

U.S. PATENT DOCUMENTS

| | | | |
|---|---|---|---|
| 2,775,266 | 12/1956 | Fick et al. | 140/115 |
| 2,976,754 | 3/1961 | Wennes | 83/98 |
| 3,524,481 | 8/1970 | Laucher et al. | 140/115 |

*Primary Examiner*—Lowell A. Larson
*Attorney, Agent, or Firm*—Hill & Simpson

[57] ABSTRACT

A method and apparatus for automatically twisting two ends of a wire protruding from a stack of rotor lamination parts employs a holder for holding and positioning the parts stack. A rotatable collar is provided having an aperture through which the two ends of the wire project. A rotating and reciprocating substantially conically-shaped head traps the wire ends between an inner edge of the rotating collar facing the conically-shaped head and the conically-shaped head when the conically-shaped head is thrust into position against the inner edge of the collar. A unit is provided for positioning the conically-shaped head against the inner edge of the collar. A rotating member rotates the conically-shaped head to twist the two ends of the wire. During twisting, clamping jaws clamp a portion of the twisted ends while the conically-shaped head continues to rotate so that a scrap portion of the twisted ends is broken off by wire fatigue and can fall free when the conically-shaped head is moved away from the inner edge of the rotating collar.

34 Claims, 6 Drawing Sheets

AUTOMATIC WIRE TWISTER

BACKGROUND OF THE INVENTION

This invention relates to a U-shaped section of wire passing through a row or stack of laminations constructed of a magnetic steel for use in forming, for example, the rotor of an electric motor. The invention may, of course, also relate to other types of magnetic material core stacks.

Figure 1:
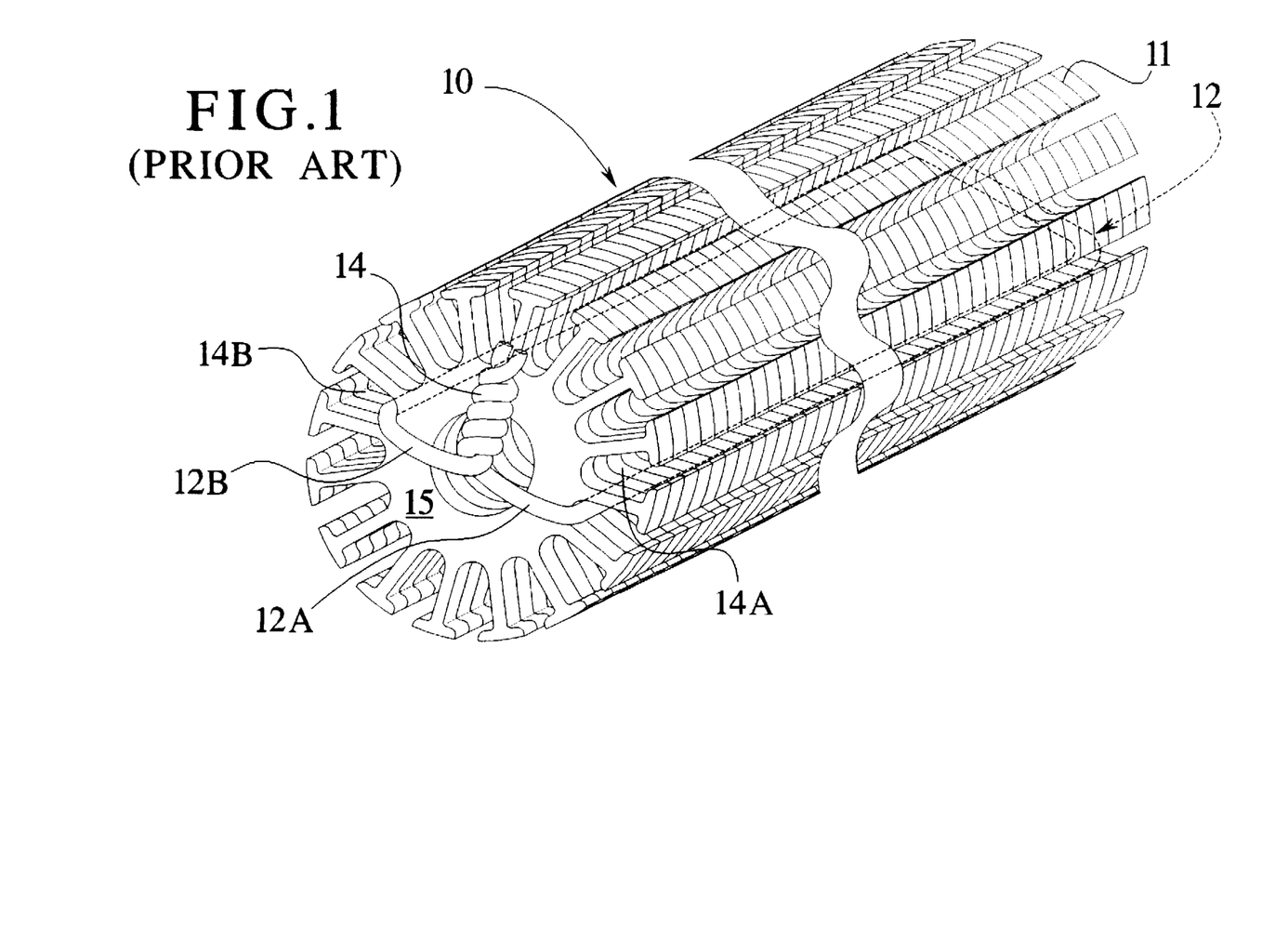
FIG. 1 is a perspective fragmentary view of a prior art stack of laminations with a U-shaped wire loop twisted at the ends for retaining the stack of laminations as an assembled secure bundle.

As shown in FIG. 1, the U-shaped loop of wire 12 passing through slots 14A, 14B retains the lamination core in a convenient stack after the lose stack of laminations has been discharged from a high speed stamping press, for example. The free ends 12A, 12B of the U-shaped loop 12 are then manually twisted by an operator, such as by holding the ends 12A, 12B with a pair of pliers and twisting the ends, or twisting the stack. Thereafter the twisted ends forming a pigtail 14 is clipped if it is too long, and is bent down flush against the face 15 of the end lamination of the stack. Thereafter, the stack can be conveniently transported to another location for processing, such as an annealing oven.

The manual twisting and cutting of the twisted pigtail 14 at the end of the stack or bundle by an operator can easily result in fatigue to the operator, and possibly long term hand related medical problems, such as carpal tunnel. Moreover, the time it takes the assembly worker to twist the ends of the U-shaped loop and then clip them off is significant. There is also the problem that there will be a variation in the amount of compression caused by the twisting force from stack to stack, since the twisting by the assembly workers may be non-uniform from stack to stack.

It has been previously known in the prior art to provide a machine which rotates the stack 10 while a worker holds the ends 12A, 12B of the wire loop with a tool such as pliers. When the operator believe sufficient twisting has been accomplished, he then removes the stack from the machine which is rotating the stack and manually clips the ends of the wires and bends them down flush against the stack.

With such a prior art machine there are the disadvantages of non-uniform winding tension with the loop, the manual gripping of the ends of the wires by the operator, the judgment required by the operator to decide when sufficient twisting has occurred, and then must manually cut away access wire at the end of the twisted pigtail. This prior art machine thus has significant disadvantages.

SUMMARY OF THE INVENTION

It is an object of the present invention to eliminate the aforementioned disadvantages with both the manual method and the previously known machine assisted method described above.

According to the invention, a method and apparatus are provided for automatically twisting two ends of a wire projecting from an end of a stack of parts to be bundled. A holder is provided for holding and positioning the part stack. A rotatable collar has an aperture through which the two ends of the wire loop project. A rotating and reciprocating substantially conically-shaped head is provided for trapping the wire ends between an inner edge of the rotating collar facing the conically-shaped head and when the conically-shaped head is thrust into position against the inner edge of the collar. A unit is provided to position the conically-shaped head against the inner edge of the collar. A rotating member rotates the conically-shaped head in order to twist the two ends of the wire. Thereafter, during the twisting, clamping jaws clamped down on the portion of the wire which has been twisted. The conically-shaped head continues twisting until a rearward portion of a pigtail caused by the twisting breaks off by wire fatigue rearwardly of the jaws. Thereafter, the conically-shaped head reciprocates back away from the inner edge of the rotating collar and the twisted off portion of the pigtail falls free. Preferably, the stack of parts comprises a stack of laminations such as motor rotor laminations. Preferably, the conically-shaped head is connected to a rotating rod passing through a reciprocating hollow piston.

The rotating rod can be attached by a flexible cable to a motor.

DESCRIPTION OF THE PREFERRED EMBODIMENTS

Figure 2:
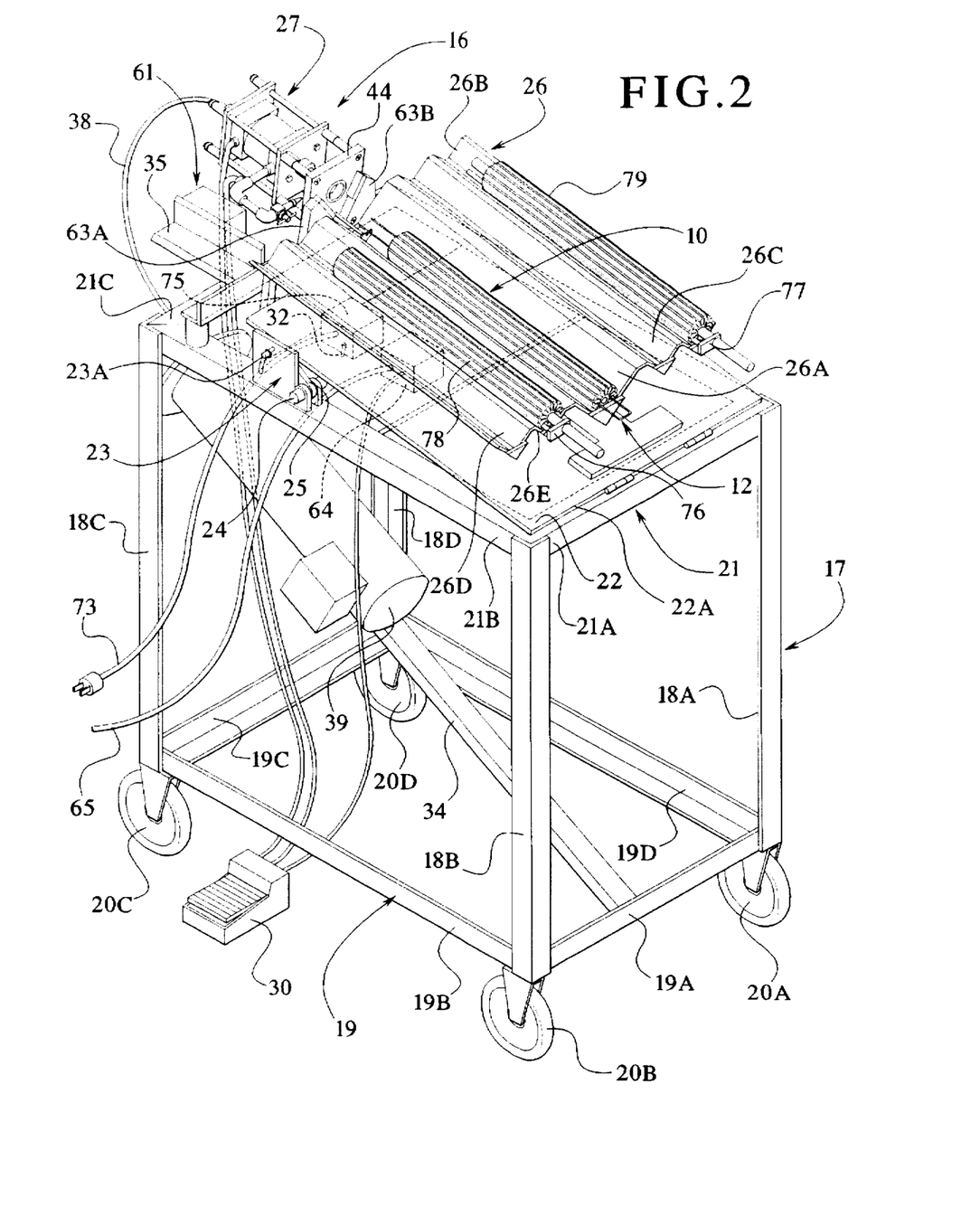
FIG. 2 is a perspective view of the automatic wire twister system of the present invention.

With reference to FIG. 2, the automatic wire twister system 16 of the invention is illustrated. The system includes a cart structure 17 having four legs 18A, B, C, D, and base members 19A, B, C, D forming a rectangular base 19. Four wheels 20A, B, C, D are attached to the base structure.

The top of the cart structure 17 has a supporting frame 21 formed of supporting frame members 21A, B, C, D. A planar table 22 has its rear end 22A resting on the supporting frame member 21A and has an upwardly sloping tilt angle adjustable by a tilt angle mechanism 23 having an adjustable bolt 23A and a pivot rod 24 attached to pivot arms 25. 23A is a screw or nut which locks the slope angle of the table 22 at a desired angle for positioning a lamination stack holder 26 resting on the table 22 so that a lamination stack 10 resting in a center groove 26A of the lamination holder 26 positions the lamination stack accurately relative to a twister mechanism 27 described hereafter.

The lamination stack holder 26 also has auxiliary grooves 26B, 26C, 26D, and 26E lying to either side of the central groove 26A for storing stacks which either have already been processed, or have not yet been processed by the automatic wire twister.

The twister mechanism 27 is mounted to a support plate 44 which is angled so that the twister mechanism 27 will substantially match a nominal angle of the tilt table. The twister mechanism 27 is also aligned with the center groove 26A of the lamination stack holder 26, and is connected by pneumatic control lines to a foot pedal 30. The foot pedal 30 also connects via a pneumatic line to a master pressure regulator 64 which receives air pressure from a pressure connecting line 65.

Clamping jaws 63A, 63B are shown in FIG. 2 in the open position prior to insertion of the wire ends.

A support structure 35 fixes the position of a limit switch 61 relative to the twister mechanism 27.

A motor 39 on a transverse support frame member 34 connects to the twister mechanism 27 via a flexible drive cable 38.

Power to the system is provided by a power cable 73 connected to a power box 75 having an on-off switch 32.

Stack holders 76, 77 having central air peripheral alignment rods are inserted in stacks 78, 79 for aligning the stacks and for transporting them to the central groove 26A, at which time the holders are removed and the wire loop 112 is inserted.

Figure 3:
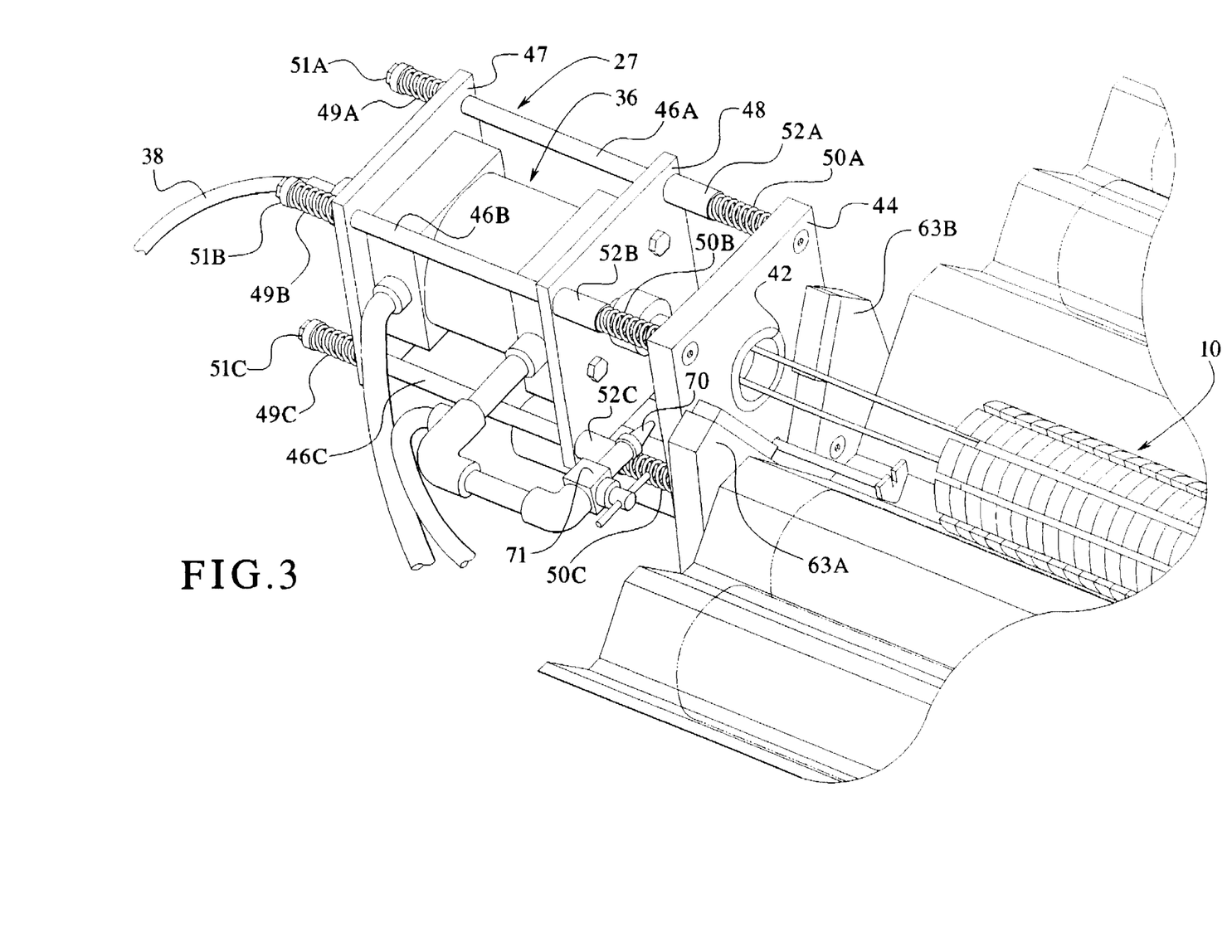
FIG. 3 is a perspective close-up view of the twisting mechanism portion of the automatic wire twister of the invention.
Figure 4:
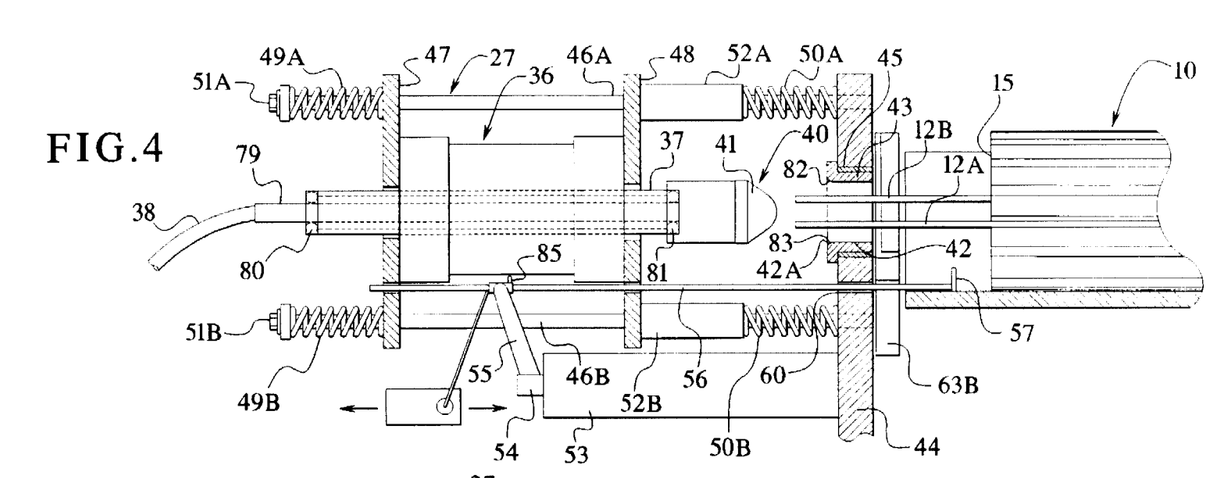
FIG. 4 is a side view of the twisting mechanism shown in FIG. 3 prior to engagement of the wire ends of the loop.

Referring now to FIG. 3, the twister mechanism 27 as shown in greater detail. A head cylinder 36 having a reciprocating hollow piston rod 37 more clearly illustrated in FIG. 4 is provided. The piston rod 37 supports inside thereof a rotating rod 79 mounted by bearings 80 and 81 which is driven by the flexible rotating cable 38.

The rotating flexible cable 38 has its other end driven by the motor 39 mounted on the transverse strut 34 as previously described.

The reciprocating rod 37 moves a head cone 40 having a conical head 41 towards and away from an aperture 42 of a rotatable bearing member 43 mounted in the support plate 44 attached to the cart structure 17. Preferably, the rotatable bearing member is a rotatable collar retained by ball bearings to the support plate 44 in a mounting aperture 45.

The head cylinder 36 is attached by four support rods 46A, B, C, D via rear and front cylinder end plates 47 and 48 to the support plate 44. The head cylinder 36 is laterally movable toward and away from the support plate 44, but is spring biased in sturdy-state position by springs 49A, B, C, D at the rear and springs 50A, B, C, D at the front. Nuts 51A, B, C, D act as a stop for the rear springs 49A, B, C, D, and extended collars 52A, B, C, D are provided extending forwardly from the front piston support plate 48 which acts as a stop for one end of the springs 50A, B, C, D. Thus springs 50A, B, C, D can be the same length as springs 49A, B, C, D.

Figure 5:
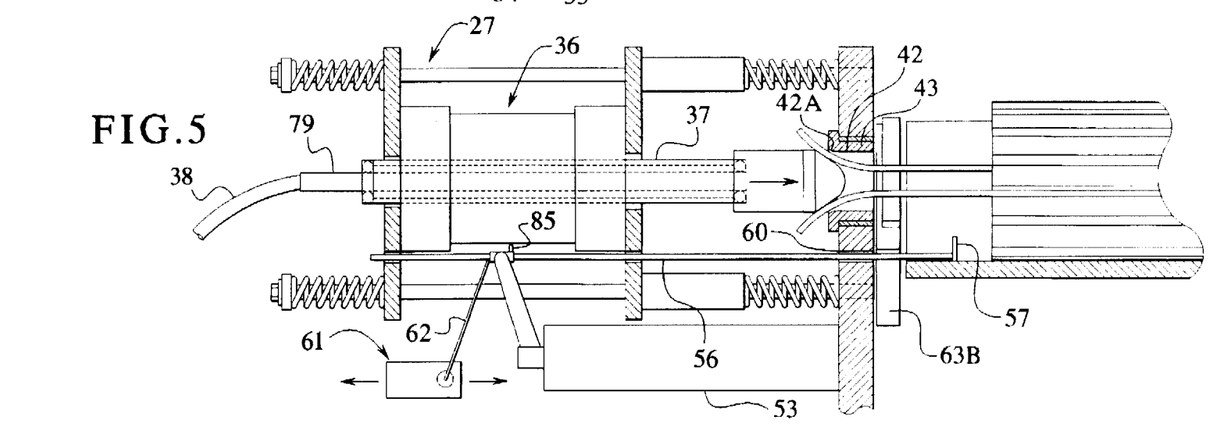
FIG. 5 is a side view of the twisting mechanism shown in FIG. 3 with the ends of the loop engaged for twisting.

When the cone head surface 41 strikes the inner annular edge 42A of the aperture 42 of the rotatable collar 43 as shown in FIG. 5, the head cylinder 36 can react to the impact because of the flexible spring mounting. This prevents damage to the wire leads 12A, 12B at the beginning of the twisting operation, and causes them to be held snugly as shown in FIG. 5B by the overall spring force provided by springs 51A, 51B, 51C, 51D. Very importantly, most of the time the cone head surface 41 is off-center when it traps the wires against the collar edge 42A, and the spring mounting allows the rod 37 and head cylinder 36 to cock or lift slightly.

Grooves 82 and 83 can be milled into the annular edge 42 to provide a locator for the wire ends 12A and 12B as the cone head 40 begins to trap the wire ends edge 42A.

A pusher cylinder 53 has one end attached to the support plate 44 and its opposite end has a reciprocating piston rod member 54 extending outwardly therefrom. A slanted arm 55 connects to and supports a reciprocating rod member 56 at its rear end, and a front end of the rod member 56 passes through an aperture 60 in the support plate 44. The end of the reciprocating rod member 56 adjacent the end face 15 of the lamination stack 10 has an upwardly extending flat pusher surface 57.

The limit switch 61 having a swinging switch arm 62 serves the lateral position of the reciprocating rod member 56.

With reference to FIG. 5, the jaws 63A, 63B in an open configuration, the reciprocating piston rod 37 pushes the cone head 40 so as to flare out the ends 12A, 12B of the wire loop. Thus, the ends 12A, 12B find their way into grooves 82, 83 and are trapped between the periphery of the conical head surface 41 and the leading edge 42A of the rotatable collar 43.

Figure 6:
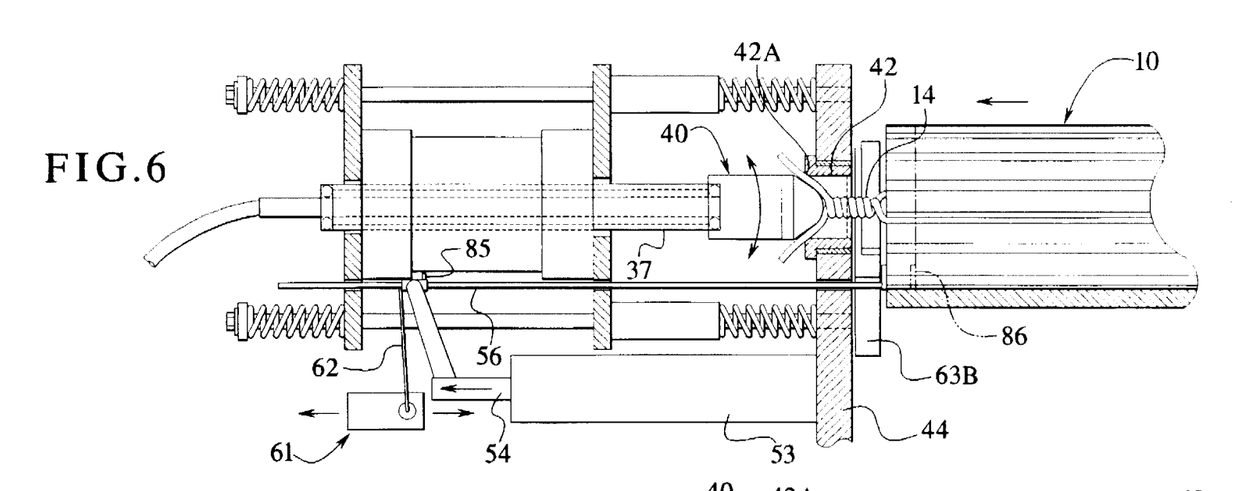
FIG. 6 is a side view of the twisting mechanism according to FIG. 3 showing the twisting of the ends of the wire loop prior to twisting off the excess wire at the ends of the pigtail.
Figure 7:
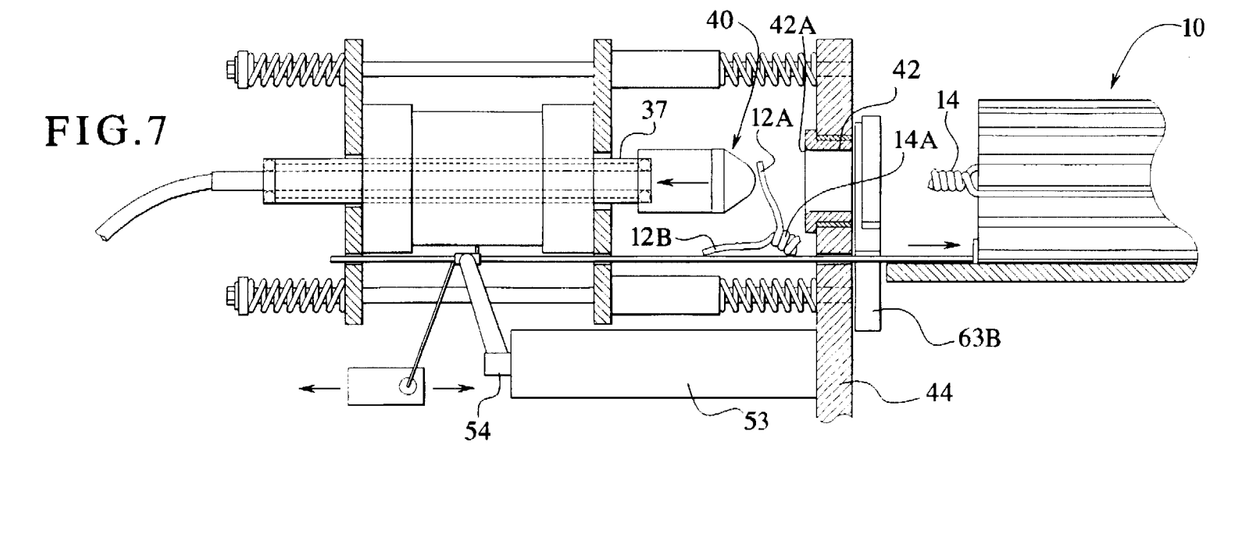
FIG. 7 is a side view showing the twisting mechanism of FIG. 3 after the excess wire at the twisted pigtail has been twisted free.

As shown in FIG. 6, a twisted pigtail 14 results. The twisting causes the lamination stack 10 to be drawn towards the support plate 44 and jaws 63A, 63B. Simultaneously, the reciprocating rod member 56 moves to the left as it is pushed by the stack and the switch arm 62 triggers the limit switch 61 which causes the jaws 63A, 63B to close onto the twisted wires and by wire fatigue, the ends 12A, 12B together with rear portion 14A break free as shown in FIG. 7. When the operator releases the foot pedal, the pusher cylinder 53 draws its piston rod 54 inwardly so that the reciprocating rod member 56 pushes the lamination stack 10 away from the jaws 63A, B and support plate 44. Simultaneously, jaws 63A, 63B open and the reciprocating rod 37 moves to the left so that the cone head 40 also moves to the left as shown in FIG. 7.

The operator now removes the stack 10 and bends the pigtail 14 flush against the end face 15 of the lamination stack 10 as shown in FIG. 1.

Figure 8:
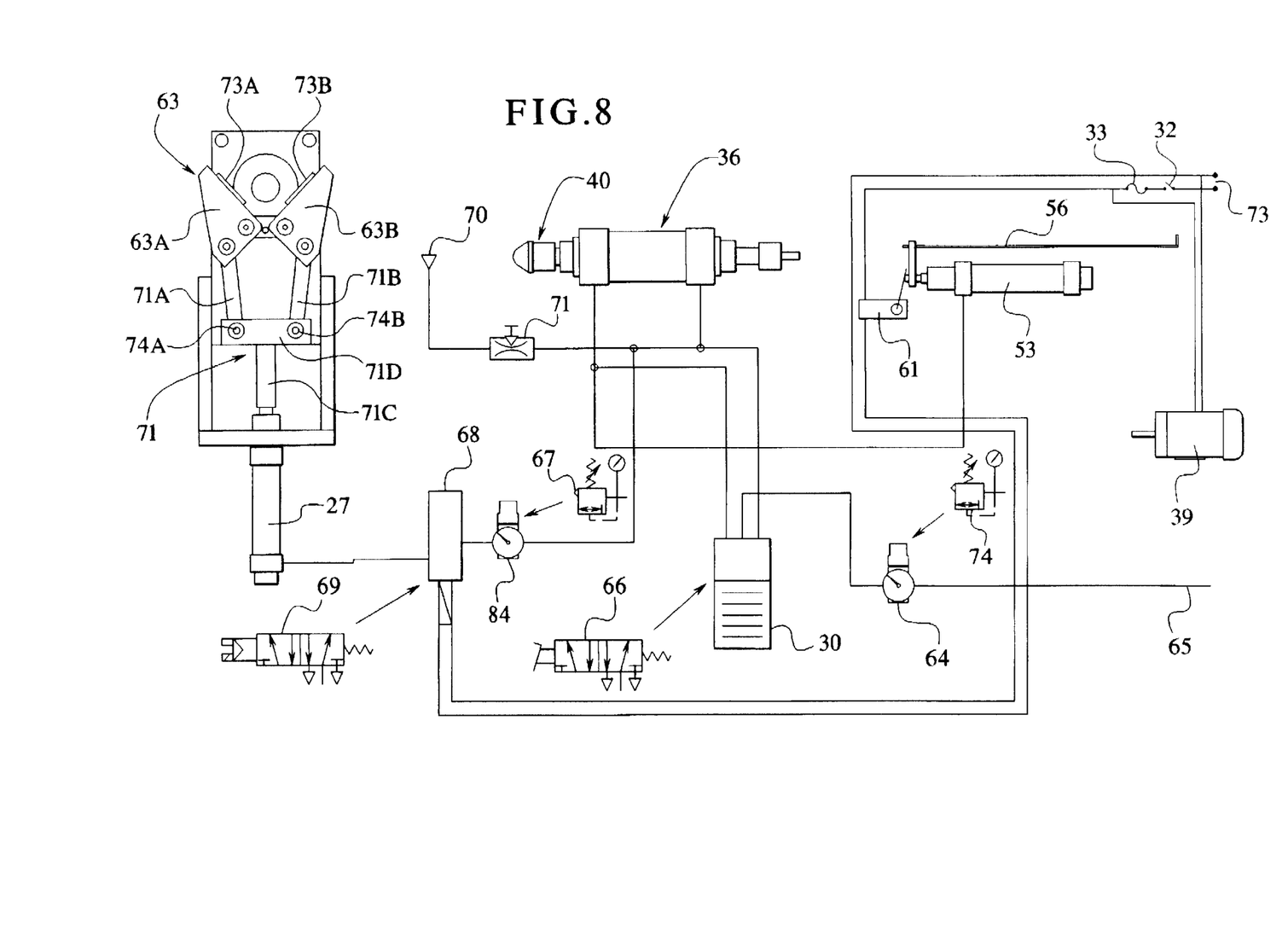
FIG. 8 is an electrical and schematic circuit diagram of the automatic wire twister system of the invention.

With reference to FIG. 8, the electronic and pneumatic circuit diagram of the overall system is illustrated. When the plug 73 is connected to a power source such as 110 volts, power is supplied through the on-off switch 32 and fuse 33 to the entire system, including the motor 39. The 110 volt power lines pass through the limit switch 61 to a five-way jaw control valve 68, details of which are shown at 69. The jaw control valve 68 controls the jaw cylinder 27 which operates the jaws 63A, 63B having flat clamping surfaces 73A, 73B mounted thereon. The jaws 63A, 63B of the jaw mechanism 63 are operated by a linking structure 71 having upper links 71A, 71B, a horizontal link bar 71D and a driving link 71C connected to the jaw cylinder 27. The link bar 71D and the links 71A, 71B are pivotably connected to each other as illustrated. Thus, upward movement of the link bar 71D causes the jaw members 63A, 63B to pivot about pins 74A, 74B resulting in opening and closing of the jaw mechanism 63.

The head cylinder 36 is controlled pneumatically by a foot pedal five-way control valve 66 showing the internal structure of the foot pedal 30. A master pressure regulator 64 provides pressure from the input pressure line 65 to the foot pedal five-way control valve 66. The structure of the master pressure regulator is shown schematically at 74.

A pigtail blow-off outlet 70, also shown in FIG. 3, connects through a flow control 71 to the foot pedal five-way control valve 66, and also connects through a jaw pressure regulator 84 to the five-way jaw control valve 68. The construction of the regulator 84 is shown in detail at 67.

Overall operation of the system will now be described.

The electrical/pneumatic layout of FIG. 8 illustrates full operation. There it can be seen that the entire operation of the automatic twister is initiated by the depression and then the release of the foot pedal 30 a few seconds later.

The fact that the twisting wire ends 12A, 12B get shorter with each successive twist provides the means by pulling to push the pusher surface 57 automatically back towards the jaws 63A, B and close the limit switch 61. This in turn activates the jaws (closed) through the solenoid operated pneumatic five-way jaw control valve 68.

When the jaws 63A, 63B close, they simply stop the wires from twisting on the bundle side, but allow the twisting to continue on the head cone 41 side after the jaws. The wires are twisted off by wire fatigue on the head cone 40 side of the jaws. This operation takes less than a second.

Removing one's foot from the foot pedal 20 causes the jaws 63A, 63B to open and the head cone 40 to retract. At the same time, the pusher cylinder 53 retracts and pushes the finished bundle or stack 10 clear of the jaws (via the pusher shaft or rod member 56). When the pusher shaft or rod member 56 is extended (which means the pusher cylinder 53 is retracted), it acts as a positive stop so that the operator cannot force a new bundle into the jaws before starting the sequence with the foot pedal 30.

The head cone 41 and the motor 39 that drives it are always in motion and do not turn on and off with the twisting sequence. The manual switch 32 in the supply line 73 is the means of starting or stopping the motor 39 and the head cone 40.

The foot pedal 30 simply sits on the floor and is attached to the twister system by three flexible air lines. This allows the operator to use the twister from either side.

By way of further explanation, the following is noted. A press operator puts a row of lams in the V-tray lamination holder groove 26A, removes the rod-like lamination alignment tool and transporter, and slides in a folded piece of wire 12. The open ends 12A, 12B of the wire will stick through the center aperture 42 of the rotating collar 43. The operator holds down the bundle or stack 10 with one hand and steps on the foot pedal 30 to initiate the drive motor 39 which turns the cone head 40 and pushes the cone head 40 against the bearing face or edge 42A. This causes the wire ends to twist and pulls the bundle toward the bearing collar 43. When the bundle 10 gets to the pre-set distance from the bearing collar 43 (adjustable limit switch 61 attached to the pusher member 56) the jaws 63 close on the twisted wire causing a break in the wire adjacent to the jaws 63 by wire fatigue. The operator releases the foot pedal 30, the motor 39 steps, the head cylinder 37 of the head cylinder 36 retracts and the operator only has to fold over the twisted wire onto the end face 15 of the bundle 10. The pigtail portion of the wire that was twisted off is blown away by blow off head 70 and falls down into a catch bin for scrap. The position of the limit switch 61 (whose physical position can be altered) determines the tightness of the bundle. In FIG. 6, dashed lines at 86 indicate a different setting of the limit switch such as by loosening the set screw 85 and resetting the position on the rod member 56.

Although various minor changes and modifications might be proposed by those skilled in the art, it will be understood that my wish is to include within the claims of the patent warranted hereon all such changes and modifications as reasonably come within my contribution to the art.

I claim as my invention:

1. An automatic lamination stack wire twister system, comprising:

a stack of lamination parts to be bundled and a retaining wire for bundling the stack having two ends projecting from an end of the stack which are to be twisted;

a holder for holding and positioning the parts stack;

a rotatable collar adjacent the holder having an aperture through which the two ends of the wire project;

a rotating and reciprocating substantially conically-shaped head adjacent the rotatable collar such that the rotatable collar lies between the holder and the conically-shaped head for trapping the wire ends between an inner edge of the rotatable collar facing the conically-shaped head and the conically-shaped head when the conically-shaped head is thrust into position against said inner edge of the collar, said inner edge lying at a side of the collar which is opposite a side of the collar facing the holder;

a unit for positioning the conically-shaped head against the inner edge of the collar; and a rotating member for rotating the conically-shaped head to twist the two ends of the wire.

2. The system of claim 1 wherein the stack of parts is a stack of magnetic material laminations.

3. The system of claim 2 wherein the stack of laminations comprises at least one core for a rotor of a motor.

4. The system according to claim 1 wherein the holder comprises an approximately V-shaped groove.

5. The system according to claim 1 wherein the rotating conically-shaped head is connected to a rotating rod passing through a hollow interior of a reciprocating piston, and wherein a drive motor is connected to rotate the rod continually both when the cone head is in position against said wires to trap said wires at said edge of said collar and also when said conically-shaped head is spaced away from said collar edge.

6. The system according to claim 5 wherein the motor is connected to the rotating rod by a flexible cable.

7. The system according to claim 1 wherein the conically-shaped head is connected by a rod passing through a hollow piston rod of a head cylinder and the head cylinder is mounted to move laterally with respect to the collar and wherein springs are provided for mounting the head cylinder to provide biased lateral spring movement when the conically-shaped head traps the ends of the wires against the inner edge of the rotating collar.

8. The system according to claim 1 wherein a reciprocating rod member is provided having a pusher surface at one end and which at the other end attaches via an arm to a pusher cylinder.

9. The system according to claim 1 wherein an operator switch is provided together with associated pneumatic and electronic circuitry for allowing an operator to activate the switch to initiate movement of the conically-shaped head toward the collar twisting the wire ends and for allowing the operator to release the switch to cause retraction of the conically-shaped head away from the rotating collar.

10. The system of claim 9 wherein the operator switch comprises a foot pedal.

11. The system according to claim 1 wherein a pneumatic source is provided for blowing a twisted off pigtail portion away from the rotating collar.

12. The system according to claim 1 wherein the holder for the stack is inclined at an angle relative to horizontal and a rotating rod connected to the conically-shaped head has a longitudinal axis also tilted substantially at said tilt angle of said support surface.

13. The system according to claim 1 wherein the conically-shaped head connects to a hollow piston rod of a head cylinder, the piston rod of the head cylinder having a rotating rod mounted by bearings passing therethrough and mounted therein, the rotating rod being connected to a motor, and the head cylinder being connected to a support

7 plate connecting to a support table frame, and wherein said holder for said stack is also connected to said support table frame.

14. The system according to claim 1 wherein said stack holder is inclined at an angle which is adjustable by a tilt mechanism for setting different tilt angles.

15. The system according to claim 1 wherein the stack holder comprises a substantially V-shaped groove.

16. The system according to claim 15 wherein additional substantially V-shaped grooves are provided to both sides of said V-shaped groove.

17. The system according to claim 1 wherein a power source is connected via a limit switch to a control valve, said control valve controlling opening and closing of a jaw cylinder for jaws for clamping the wire ends after they have been twisted at least partially, said control valve also providing air pressure for operating a head cylinder for reciprocating said conically-shaped head and a connected foot pedal along with a pusher cylinder for operating a reciprocating pusher member having an end face sensing a position of the parts stack.

18. The system according to claim 1 including two grooves at said inner edge of the collar for trapping the wire ends.

19. An automatic lamination stack wire twister system, comprising:

a stack of lamination parts to be bundled and a retaining wire for bundling the stack having two ends projecting from an end of the stack which are to be twisted;

a holder for holding and positioning the parts stack;

a rotatable collar having an aperture through which the two ends of the wire project;

a rotating and reciprocating substantially conically-shaped head for trapping the wire ends between an inner edge of the rotatable collar facing the conically-shaped head and the conically-shaped head when the conically-shaped head is thrust into position against said inner edge of the collar;

a unit for positioning the conically-shaped head against the inner edge of the collar;

a rotating member for rotating the conically-shaped head to twist the two ends of the wire; and clamping jaws for clamping the wire ends positioned between an end of the stack where the wires outwardly protrude and the rotatable collar.

20. The system according to claim 19 wherein the jaws are in a V configuration when opened and are closed by a jaw cylinder pushing upwardly on a horizontal link having first and second vertical links pivotally connected to the jaws and the jaws being pivoted about respective pivot points.

21. The system according to claim 19 wherein a reciprocating member is provided having an end face sensing where an end face of the stack is located relative to the rotatable collar and for triggering a closing of said jaws when said reciprocating member is in a defined position relative to the rotatable collar.

22. An automatic lamination stack wire twister system, comprising:

a stack of lamination parts to be bundled and a retaining wire for bundling the stack having two ends projecting from an end of the stack which are to be twisted;

a holder for holding and positioning the parts stack;

a rotatable collar having an aperture through which the two ends of the wire project;

a rotating and reciprocating substantially conically-shaped head for trapping the wire ends between an

8 inner edge of the rotatable collar facing the conically-shaped head and the conically-shaped head when the conically-shaped head is thrust into position against said inner edge of the collar;

a unit for positioning the conically-shaped head against the inner edge of the collar;

a rotating member for rotating the conically-shaped head to twist the two ends of the wire; and a switch unit being provided for sensing a final position of an end face of said stack relative to said collar when twisting of the wire ends has been completed.

23. A method for twisting wire ends protruding outwardly from an end face of a parts stack of laminations, comprising the steps of:

providing a rotatable member having an inner aperture for receiving the wire ends;

providing a support member for supporting the stack relative to the inner aperture of the rotatable member;

positioning the parts stack on the support member and placing the wire ends through the inner aperture of the rotatable member;

initiating a movement of a substantially conical surface towards a side of said inner aperture of said rotatable member which is opposite a side of the inner aperture facing said parts stack so as to trap the wire ends between said inner aperture of the rotatable member and the conical surface; and with the conical surface rotating, twisting the wire ends.

24. The method of claim 23 including the steps of trapping the wire ends against an inner edge of the inner aperture facing the conical surface and providing the rotatable member as a collar bearing.

25. The method according to claim 23 including the step of rotating the conical surface prior to its engagement with said inner aperture of the rotatable member and continuing rotation of the conical surface after the conical surface has engaged the inner aperture of the rotatable member.

26. The method of claim 23 including the steps of forming a U-shaped wire loop and threading the ends of the wire loop through the parts stack prior to the twisting of the ends.

27. The method of claim 23 wherein the parts stack comprises motor rotor laminations.

28. The method of claim 23 wherein the twisted portion of the wire ends is clamped after they have been partially twisted and then continuing to twist until a portion of a twisted pigtail rearwardly of the clamping and facing the conical surface is twisted off by wire fatigue as scrap material, and then using air flow to blow away the twisted off scrap material.

29. A method for twisting wire ends protruding outwardly from an end face of a parts stack of laminations, comprising the steps of:

providing a rotatable member having an inner aperture for receiving the wire ends;

providing a support member for supporting the stack relative to the inner aperture of the rotatable member;

positioning the parts stack on the support member and placing the wire ends through the inner aperture of the rotatable member;

initiating a movement of a substantially conical surface towards said inner aperture of said rotatable member so as to trap the wire ends between said inner aperture of the rotatable member and the conical surface; and with the conical surface rotating, twisting the wire ends such that;

a twisted portion of the wire ends is clamped after they have been partially twisted and then continuing to twist with the conical surface and the rotatable member until a portion of a twisted pigtail rearwardly of the clamping and facing the conical surface is twisted off by wire fatigue as scrap material.

30. A method for twisting wire ends protruding outwardly from an end face of a parts stack of laminations, comprising the steps of:

providing a rotatable member having an inner aperture for receiving the wire ends;

providing a support member for supporting the stack relative to the inner aperture of the rotatable member;

positioning the parts stack on the support member and placing the wire ends through the inner aperture of the rotatable member;

initiating a movement of a substantially conical surface towards said inner aperture of said rotatable member so as to trap the wire ends between said inner aperture of the rotatable member and the conical surface;

with the conical surface rotating, twisting the wire ends; and providing flexible movement of the conical surface relative to the rotatable member such that when the conical surface impacts and traps the wire ends against an inner edge of the inner aperture of the rotating member the conical surface can flexibly move relative to the rotatable member to absorb impact.

31. A method for twisting wire ends protruding outwardly from an end face of a parts stack of laminations, comprising the steps of:

providing a rotatable member having an inner aperture for receiving the wire ends;

providing a support member for supporting the stack relative to the inner aperture of the rotatable member;

positioning the parts stack on the support member and placing the wire ends through the inner aperture of the rotatable member;

initiating a movement of a substantially conical surface towards said inner aperture of said rotatable member so as to trap the wire ends between said inner aperture of the rotatable member and the conical surface;

with the conical surface rotating, twisting the wire ends; and sensing a position of an end face of the stack as it is pulled closer to the rotatable member caused by the twisting of the wire ends and using the position of the end face to initiate a clamping of a portion of the twisted ends during twisting.

32. A method for twisting wire ends protruding outwardly from an end face of a parts stack of laminations, comprising the steps of:

providing a rotatable member having an inner aperture for receiving the wire ends;

providing a support member for supporting the stack relative to the inner aperture of the rotatable member;

positioning the parts stack on the support member and placing the wire ends through the inner aperture of the rotatable member;

initiating a movement of a substantially conical surface towards said inner aperture of said rotatable member so as to trap the wire ends between said inner aperture of the rotatable member and the conical surface;

with the conical surface rotating, twisting the wire ends; and clamping the twisted ends after they have been partially twisted and then continuing twisting of the wire ends rearwardly of the clamping until a portion of the wire ends breaks off by wire fatigue and a scrap twisted portion can then fall free when the conically-shaped surface is withdrawn from the inner aperture of the rotatable member.

33. An automatic wire twister system, comprising:

a stack of parts to be bundled and retaining wire for bundling the stack having two ends projecting from an end of the stack which are automatically twisted;

a rotatable member having an inner aperture through which the two ends of the wire project;

a rotating and laterally movable head for trapping the wire ends between the inner aperture facing the head when the head is thrust into position against said inner aperture;

a rotating member for rotating the head to twist the two ends of the wire; and a clamp positioned at a side of the rotatable member opposite the moveable head to clamp a twisted portion of the two ends of the wire.

34. A method for twisting wire ends protruding outwardly from an end face of a parts stack, comprising the steps of:

providing a rotatable member having an inner aperture for receiving the wire ends;

positioning the parts stack relative to said inner aperture so that said wire ends project through the inner aperture;

initiating a movement of a head towards a side of said inner aperture of said rotatable member which is opposite a side of the inner aperture facing said parts stack so as to trap the wire ends between the inner aperture of the rotatable member and the head; and with the head rotating, twisting the wire ends.

* * * * *